US012687691B2

(12) United States Patent
Etheridge et al.

(10) Patent No.: US 12,687,691 B2
(45) Date of Patent: Jul. 21, 2026

(54) CABLE ENCLOSURE ASSEMBLY HAVING RECEIVING AREA CONFIGURED TO ALTERNATIVELY RECEIVE CABLE RETAINER AND CABLE ADAPTER TO ALLOW PLURALITY OF CONFIGURATIONS

(71) Applicant: PPC BROADBAND, INC., East Syracuse, NY (US)

(72) Inventors: Harvey Etheridge, Norfolk (GB); Shaun Trezise, Aldeburgh (GB); Stefan Donchev, Milton Keynes (GB)

(73) Assignee: PPC BROADBAND, INC., East Syracuse, NY (US)

( * ) Notice: Subject to any disclaimer, the term of this patent is extended or adjusted under 35 U.S.C. 154(b) by 254 days.

(21) Appl. No.: 18/117,063

(22) Filed: Mar. 3, 2023

(65) Prior Publication Data

US 2023/0280540 A1    Sep. 7, 2023

Related U.S. Application Data

(60) Provisional application No. 63/316,091, filed on Mar. 3, 2022.

(51) Int. Cl.
*G02B 6/36* (2006.01)
*G02B 6/44* (2006.01)
*G02B 6/38* (2006.01)

(52) U.S. Cl.
CPC ....... *G02B 6/44775* (2023.05); *G02B 6/3624* (2013.01); *G02B 6/4441* (2013.01);
(Continued)

(58) Field of Classification Search
CPC .. G02B 6/3624; G02B 6/3825; G02B 6/4441; G02B 6/44528; G02B 6/4471; G02B 6/44775; G02B 6/44785
See application file for complete search history.

(56) References Cited

U.S. PATENT DOCUMENTS 3,229,026 A * 1/1966 Sulzer .................. H02G 3/0616
174/664
4,555,589 A 11/1985 Osada
(Continued)

FOREIGN PATENT DOCUMENTS

CA 2922709 C 10/2021
CN 105247399 A 1/2016
(Continued)

OTHER PUBLICATIONS

CN110989109A with English translation. (Year: 2019).*
(Continued)

*Primary Examiner* — Ryan A Lepisto
(74) *Attorney, Agent, or Firm* — MH2 TECHNOLOGY LAW GROUP LLP

(57) ABSTRACT

A cable enclosure assembly having a receiving area configured to alternatively receive a cable retainer and a cable adapter so as to permit an opening of the cable enclosure assembly to be alternatively configured as a cable pass through and an adapter port, includes: a base; a receiving area in the base. The receiving area is configured to receive a cable retainer that comprises a first portion and a second portion connected by a pivot portion; the cable retainer comprises a first exterior surface and a second exterior surface that are configured to contact the receiving area; the receiving area is configured to receive a cable adapter; and the receiving area is configured to alternatively receive the cable retainer and the cable adapter so as to permit an opening of the cable enclosure assembly to be alternatively configured as a cable pass through and an adapter port.

19 Claims, 5 Drawing Sheets

(52) U.S. Cl.
CPC ....... *G02B 6/44528* (2023.05); *G02B 6/4471*
(2013.01); *G02B 6/44785* (2023.05); *G02B*
*6/3825* (2013.01)

(56) References Cited

U.S. PATENT DOCUMENTS

| | | | |
|---|---|---|---|
| 6,721,484 B1 | 4/2004 | Blankenship | |
| 7,418,186 B1 | 8/2008 | Grubish et al. | |
| 7,499,622 B2* | 3/2009 | Castonguay | H04Q 1/023 |
| | | | 385/139 |
| 7,781,684 B2* | 8/2010 | Stuckmann | H02G 3/088 |
| | | | 174/152 G |
| 8,033,408 B2* | 10/2011 | Makela | H02G 3/088 |
| | | | 174/152 G |
| 8,111,966 B2* | 2/2012 | Holmberg | G02B 6/445 |
| | | | 385/134 |
| 8,265,447 B2 | 9/2012 | Loeffelholz et al. | |
| 8,891,928 B2* | 11/2014 | Marmon | G02B 6/4444 |
| | | | 385/135 |
| 8,921,693 B2* | 12/2014 | Benedetto | G02B 6/44775 |
| | | | 361/600 |
| 9,008,483 B2* | 4/2015 | Larsson | G02B 6/44785 |
| | | | 385/135 |
| 9,323,020 B2 | 4/2016 | Cao et al. | |
| 9,372,319 B1 | 6/2016 | Ray et al. | |
| 9,563,031 B2 | 2/2017 | Loeffelholz et al. | |
| 9,568,696 B2 | 2/2017 | Ray et al. | |
| 9,696,511 B2 | 7/2017 | Michiels et al. | |
| 9,910,235 B2 | 3/2018 | Larson et al. | |
| 10,268,010 B2 | 4/2019 | Pasek et al. | |
| 10,656,358 B2 | 5/2020 | Bandy et al. | |
| 11,009,671 B2 | 5/2021 | Kowalczyk et al. | |
| 11,061,198 B2 | 7/2021 | Daoust et al. | |
| 11,391,901 B2* | 7/2022 | Allen | G02B 6/2551 |
| 11,397,300 B2 | 7/2022 | Leeson et al. | |
| 11,624,884 B2 | 4/2023 | Coan et al. | |
| 12,095,244 B2* | 9/2024 | Vastmans | G02B 6/4444 |
| 2010/0202746 A1* | 8/2010 | Sokolowski | G02B 6/389 |
| | | | 385/135 |
| 2011/0097052 A1 | 4/2011 | Solheid et al. | |
| 2012/0043103 A1 | 2/2012 | Yin | |
| 2013/0098677 A1 | 4/2013 | Benedetto et al. | |
| 2014/0312753 A1 | 10/2014 | Courchaine et al. | |
| 2015/0144394 A1 | 5/2015 | Webb | |
| 2017/0031123 A1 | 2/2017 | Tong et al. | |
| 2018/0284380 A1 | 10/2018 | Meira | |
| 2018/0372978 A1 | 12/2018 | Wentworth et al. | |
| 2021/0072479 A1 | 3/2021 | Ward | |
| 2022/0146770 A1 | 5/2022 | Carrico et al. | |
| 2023/0040946 A1 | 2/2023 | Lane et al. | |
| 2023/0102638 A1* | 3/2023 | Hubbard | H02G 11/00 |
| | | | 385/135 |
| 2023/0204888 A1 | 6/2023 | Geens et al. | |

FOREIGN PATENT DOCUMENTS

| | | | |
|---|---|---|---|
| CN | 110582911 A | 12/2019 | |
| CN | 110989109 A * | 4/2020 | .......... G02B 6/4446 |
| CN | 112585831 A | 3/2021 | |
| EP | 0543173 A1 | 5/1993 | |
| EP | 3791221 B1 | 9/2023 | |
| GB | 2594022 A | 10/2021 | |
| GB | 2579458 B | 4/2022 | |
| JP | 2020154168 A | 9/2020 | |
| JP | 6910456 B2 | 7/2021 | |
| JP | 2022109900 A | 7/2022 | |
| KR | 20110003316 U | 3/2011 | |
| WO | 2008141142 A2 | 11/2008 | |
| WO | 2010040256 A1 | 4/2010 | |
| WO | 2014186433 A1 | 11/2014 | |
| WO | 2016130292 A1 | 8/2016 | |
| WO | 2019215509 A1 | 11/2019 | |
| WO | 2020120343 A1 | 6/2020 | |
| WO | 2020236740 A1 | 11/2020 | |
| WO | 2021061988 A1 | 4/2021 | |
| WO | 2022162671 A1 | 8/2022 | |
| WO | 2022256327 A1 | 12/2022 | |

OTHER PUBLICATIONS

International Search Report and Written Opinion dated Jun. 30, 2023 in corresponding International Application No. PCT/US2023/014467, 10 pages.

* cited by examiner

CABLE ENCLOSURE ASSEMBLY HAVING RECEIVING AREA CONFIGURED TO ALTERNATIVELY RECEIVE CABLE RETAINER AND CABLE ADAPTER TO ALLOW PLURALITY OF CONFIGURATIONS

CROSS-REFERENCE TO RELATED APPLICATION

This application claims the benefit of U.S. Provisional Application No. 63/316,091 filed Mar. 3, 2022, the disclosure of which is hereby incorporated by reference herein in its entirety.

BACKGROUND

The present disclosure relates generally to a cable enclosure for storing cable such as, for example, fiber optic cable.

In many traditional communications networks, fiber optic cables have been used to carry data long distances between telecommunication company installations. In such traditional communications networks, other types of cables, such as copper wire loops and coaxial cables, have been used to carry data from telecommunication company installations to homes and businesses. There has been a movement to extend the fiber optic portion of the communications networks closer to homes and businesses. In some circumstances, the fiber optic portions of the communications networks extend into the homes and businesses themselves.

Extending the fiber optic portion of a communications network closer to homes and businesses has necessitated the deployment of cable enclosures which may be used to store slack cable and/or to splice cables. A splice enclosure is an enclosure that is designed to facilitate splicing and termination of one or more fiber optic cables. A typical splice enclosure has at least one cable entry port through which one or more fiber optic cables enter. One or more of the cable entry ports may accommodate "feeder" cables that connect to upstream points, such as telecommunication company installations, in a communications network. One or more of the other cable entry ports may accommodate "drop" cables that connect to downstream points in the communications network, such as homes and businesses.

Cable enclosures are frequently mounted on utility poles, walls, utility boxes, and other outdoor surfaces. Because cable enclosures may be mounted outdoors, they are exposed to various environmental elements such as heat, cold, dust, sunlight, rain, snow, plants, animals, and so on. Particularly with splice enclosures, the splicing and termination capabilities of a splice enclosure could be destroyed or impaired if such environmental elements were permitted to access the interior of the splice enclosure. It is important to ensure that such environmental elements are not permitted to access the interior of the splice enclosure.

Grommets are traditionally used to support and guide a cable or an elongated member through an opening in a panel of the cable enclosure. To the extent such enclosures implement adapters, adapters are generally mounted on the backwall of the enclosure proximate to the spool.

It may be desirable to provide a cable enclosure assembly having a receiving area that is configured to receive a cable retainer and is configured to receive a cable adapter to allow the cable enclosure assembly to be configured in a plurality of configurations.

SUMMARY

According to an exemplary embodiment of the disclosure, a cable enclosure assembly may include a base, a cover panel, first and second openings, a plurality of channels disposed proximate to each of the first and second openings, and a grommet wherein the first and second openings are configured to receive either an adapter or the grommet. In embodiments, the grommet may include a pair of side extensions configured to be seated in one channel of the plurality of channels. In embodiments, the first opening and the second opening of the base are each configured to receive either the grommet or an adapter. In embodiments, the adapter may be configured to couple two connectors. In embodiments, the adapter may include a pair of lateral extensions configured to be seated in one channel of the plurality of channels.

The grommet may include a horizontal side, a left vertical side, a right vertical side, and an interior grommet surface such that a rib is defined on a surface of a cable passageway defined in the grommet. The rib may be configured to be disposed in a groove defined by a cable. The grommet may include a first portion and a second portion joined to the first portion through a living hinge disposed at the horizontal side of the grommet. In embodiments, the first portion and second portion of the grommet may be configured to pivot relative to each other at the living hinge.

The base may include a backwall, a first sidewall, a second sidewall, a third sidewall and a fourth sidewall, wherein the backwall, the first sidewall, the second sidewall, the third sidewall and the fourth sidewall define an interior cavity. The cover panel or door may be configured to be selectively removed or affixed to the base. The panel movable can, but does not necessarily, move relative to the base between a first closed position and a second open position. A splice sleeve may be coupled to the backwall of the base. The splice sleeve can be configured to accommodate an optical fiber connection. The first opening and the second opening can be defined in the first sidewall of the base. Each channel can include a channel wall.

In embodiments, the channel walls of the plurality of channels may be integral to the backwall of the base. The base may further define a spool at the backwall of the base wherein the spool is configured to have slack cable wound thereon.

Various embodiments of the disclosure include a cable enclosure assembly having a receiving area configured to alternatively receive a cable retainer and a cable adapter so as to permit an opening of the cable enclosure assembly to be alternatively configured as a cable pass through and an adapter port, including: a base; and a cover configured to be attached to the base. The base comprises a plurality of walls, an opening, and a receiving area; the plurality of walls defines an interior volume; the opening is in one of the plurality of walls; the opening is configured to be a portion of the receiving area; the receiving area is configured to receive a cable retainer; the cable retainer is configured to receive a cable entering the base; the cable retainer comprises a first portion and a second portion; the first portion of the cable retainer is connected to the second portion of the cable retainer by a hinge; the hinge is configured to permit the first portion of the cable retainer to pivot relative to the second portion of the cable retainer; the cable retainer comprises a first exterior surface and a second exterior surface; the first exterior surface is planar and the second exterior surface is planar; the first exterior surface is configured to be parallel to the second exterior surface when the cable retainer is in a fully installed position in the receiving area; the receiving area comprises opposed first and second side edges; the first and second side edges of the receiving area are configured to contact the cable retainer when the cable retainer is in the fully installed position; the receiving area is configured to receive a cable adapter; and the receiving area is configured to alternatively receive the cable retainer and the cable adapter so as to permit the opening of the cable enclosure assembly to be alternatively configured as a cable pass through and an adapter port Various embodiments of the disclosure may also include a cable enclosure assembly that includes: a base; and a cover configured to be attached to the base. The base may comprise a plurality of walls, an opening, and a receiving area. The plurality of walls may define an interior volume. And the receiving area may be configured to alternatively receive a cable retainer and a cable adapter so as to permit the opening of the cable enclosure assembly to be alternatively configured as a cable pass through and an adapter port.

In particular embodiments, the opening is in one of the plurality of walls.

In particular embodiments, the opening is configured to be a portion of the receiving area.

In particular embodiments, the receiving area is configured to receive a cable retainer.

In particular embodiments, the cable retainer is configured to receive a cable entering the base.

In particular embodiments, the cable retainer comprises a first portion and a second portion.

In particular embodiments, the first portion of the cable retainer is connected to the second portion of the cable retainer by a hinge.

In particular embodiments, the hinge is configured to permit the first portion of the cable retainer to pivot relative to the second portion of the cable retainer.

In particular embodiments, the cable retainer comprises a first exterior surface and a second exterior surface.

In particular embodiments, the first exterior surface is planar and the second exterior surface is planar.

In particular embodiments, the first exterior surface is configured to be parallel to the second exterior surface when the cable retainer is in a fully installed position in the receiving area.

In particular embodiments, the receiving area comprises opposed first and second side edges.

In particular embodiments, the first and second side edges of the receiving area are configured to contact the cable retainer when the cable retainer is in the fully installed position.

In particular embodiments, the receiving area is configured to receive a cable adapter.

In particular embodiments, the hinge is a living hinge integrally formed with the first portion of the cable retainer and the second portion of the cable retainer.

In particular embodiments, the first side edge of the receiving area is parallel to the second side edge of the receiving area.

In particular embodiments, the base is configured to have a backwall, a first sidewall, a second sidewall, a third sidewall, and a fourth sidewall.

In particular embodiments, the first sidewall, the second sidewall, the third sidewall, and the fourth sidewall extend from the backwall.

In particular embodiments, the cable enclosure assembly further comprises a splice sleeve located in the interior volume of the base.

In particular embodiments, the receiving area comprises a channel wall having a side edge.

In particular embodiments, the side edge is configured to contact the cable retainer.

In particular embodiments, the channel wall comprises a plurality of channel walls.

In particular embodiments, the plurality of channel walls define a channel in the base.

In particular embodiments, the cable retainer comprises a side extension extending from the first portion of the cable retainer.

In particular embodiments, the side extension is configured to be received in the channel.

In particular embodiments, the channel comprises a first channel, and the base further comprises a second channel.

In particular embodiments, the side extension comprises a first side extension, and the cable retainer further comprises a second side extension extending from the second portion of the cable retainer.

In particular embodiments, the second channel is configured to receive the second side extension.

In particular embodiments, the cable retainer is a grommet.

Various embodiments of the disclosure include a cable enclosure assembly having a receiving area configured to alternatively receive a cable retainer and a cable adapter so as to permit an opening of the cable enclosure assembly to be alternatively configured as a cable pass through and an adapter port, including: a base portion comprising an opening and a receiving area; and a cover portion configured to be attached to the base portion. The opening is configured to be a portion of the receiving area; the receiving area is configured to receive a cable retainer; the cable retainer is configured to receive a cable entering the base portion; the cable retainer comprises a first portion and a second portion connected by a pivot portion, the pivot portion being configured to permit the first portion of the cable retainer to pivot relative to the second portion of the cable retainer; the cable retainer comprises a first planar exterior surface and a second planar exterior surface, the first exterior surface being configured to be parallel to the second exterior surface when the cable retainer is in a fully installed position in the receiving area; the receiving area is configured to receive a cable adapter; and the receiving area is configured to alternatively receive the cable retainer and the cable adapter so as to permit the opening of the cable enclosure assembly to be alternatively configured as a cable pass through and an adapter port.

Various embodiments of the disclosure include a cable enclosure assembly having a receiving area configured to alternatively receive a cable retainer and a cable adapter so as to permit an opening of the cable enclosure assembly to be alternatively configured as a cable pass through and an adapter port that includes: a base portion comprising an opening and a receiving area; and a cover portion configured to be attached to the base portion. The receiving area is configured to alternatively receive a cable retainer and a cable adapter so as to permit the opening of the cable enclosure assembly to be alternatively configured as a cable pass through and an adapter port.

In particular embodiments, the opening is configured to be a portion of the receiving area.

In particular embodiments, the receiving area is configured to receive a cable retainer.

In particular embodiments, the cable retainer is configured to receive a cable entering the base portion.

In particular embodiments, the cable retainer comprises a first portion and a second portion.

In particular embodiments, the first portion of the cable retainer is connected to the second portion of the cable retainer by a pivot portion.

In particular embodiments, the pivot portion is configured to permit the first portion of the cable retainer to pivot relative to the second portion of the cable retainer.

In particular embodiments, the cable retainer comprises a first exterior surface and a second exterior surface.

In particular embodiments, the first exterior surface is planar and the second exterior surface is planar.

In particular embodiments, the first exterior surface is configured to be parallel to the second exterior surface when the cable retainer is in a fully installed position in the receiving area.

In particular embodiments, the receiving area is configured to receive a cable adapter.

In particular embodiments, the receiving area has a channel wall having a side edge.

In particular embodiments, the side edge of the channel wall is configured to contact the cable retainer when the cable retainer is in the fully installed position.

In particular embodiments, the pivot portion is a living hinge and is integrally formed with the first portion of the cable retainer and the second portion of the cable retainer.

In particular embodiments, the opening comprises a first side edge and a second side edge, and the first side edge of the opening is parallel to the second side edge of the opening.

Various embodiments of the disclosure include a cable enclosure assembly having a receiving area configured to alternatively receive a cable retainer portion and a cable adapter portion so as to permit an opening of the cable enclosure assembly to be alternatively configured as a cable pass through and an adapter port, including: a base portion; and a receiving area in the base portion. The receiving area is configured to receive a cable retainer portion that comprises a first portion and a second portion connected by a pivot portion; the cable retainer portion comprises a first exterior surface and a second exterior surface that are configured to contact the receiving area; the receiving area is configured to receive a cable adapter portion; and the receiving area is configured to alternatively receive the cable retainer portion and the cable adapter portion so as to permit an opening of the cable enclosure assembly to be alternatively configured as a cable pass through and an adapter port.

Various embodiments of the disclosure include a cable enclosure assembly having a receiving area configured to alternatively receive a cable retainer portion and a cable adapter portion so as to permit an opening of the cable enclosure assembly to be alternatively configured as a cable pass through and an adapter port that includes: a base portion; and a receiving area in the base portion. The receiving area is configured to receive a cable retainer portion; and the receiving area is configured to alternatively receive the cable retainer portion and a cable adapter portion so as to permit an opening of the cable enclosure assembly to be alternatively configured as a cable pass through and an adapter port.

In particular embodiments, the cable retainer portion is configured to receive a cable entering the interior volume.

In particular embodiments, the cable retainer portion comprises a first portion and a second portion.

In particular embodiments, the first portion of the cable retainer portion is connected to the second portion of the cable retainer portion by a pivot portion.

In particular embodiments, the cable retainer portion comprises a first exterior surface and a second exterior surface that are configured to contact the receiving area.

In particular embodiments, the receiving area is configured to receive a cable adapter portion.

In particular embodiments, the first exterior surface is configured to be parallel to the second exterior surface when the cable retainer is in a fully installed position in the receiving area.

In particular embodiments, the receiving area comprises a channel.

In particular embodiments, the cable retainer portion comprises a side extension extending from the first portion of the cable retainer portion.

In particular embodiments, the side extension is configured to be received in the channel.

In particular embodiments, the pivot portion is configured to permit the first portion of the cable retainer portion to pivot relative to the second portion of the cable retainer portion.

In particular embodiments, the pivot portion is a living hinge and is integrally formed with the first portion of the cable retainer portion and the second portion of the cable retainer portion.

In particular embodiments, the cable retainer portion is configured to receive a cable.

DETAILED DESCRIPTION

Embodiments of the disclosure provide a cable enclosure assembly having a receiving area that is configured to receive a cable retainer and is configured to receive a cable adapter to allow the cable enclosure assembly to be configured in a plurality of configurations.

As a preface to the detailed description, it should be noted that, as used in this specification and the appended claims, the singular forms "a," "an," and "the" include plural referents, unless the context clearly dictates otherwise.

Figure 1:
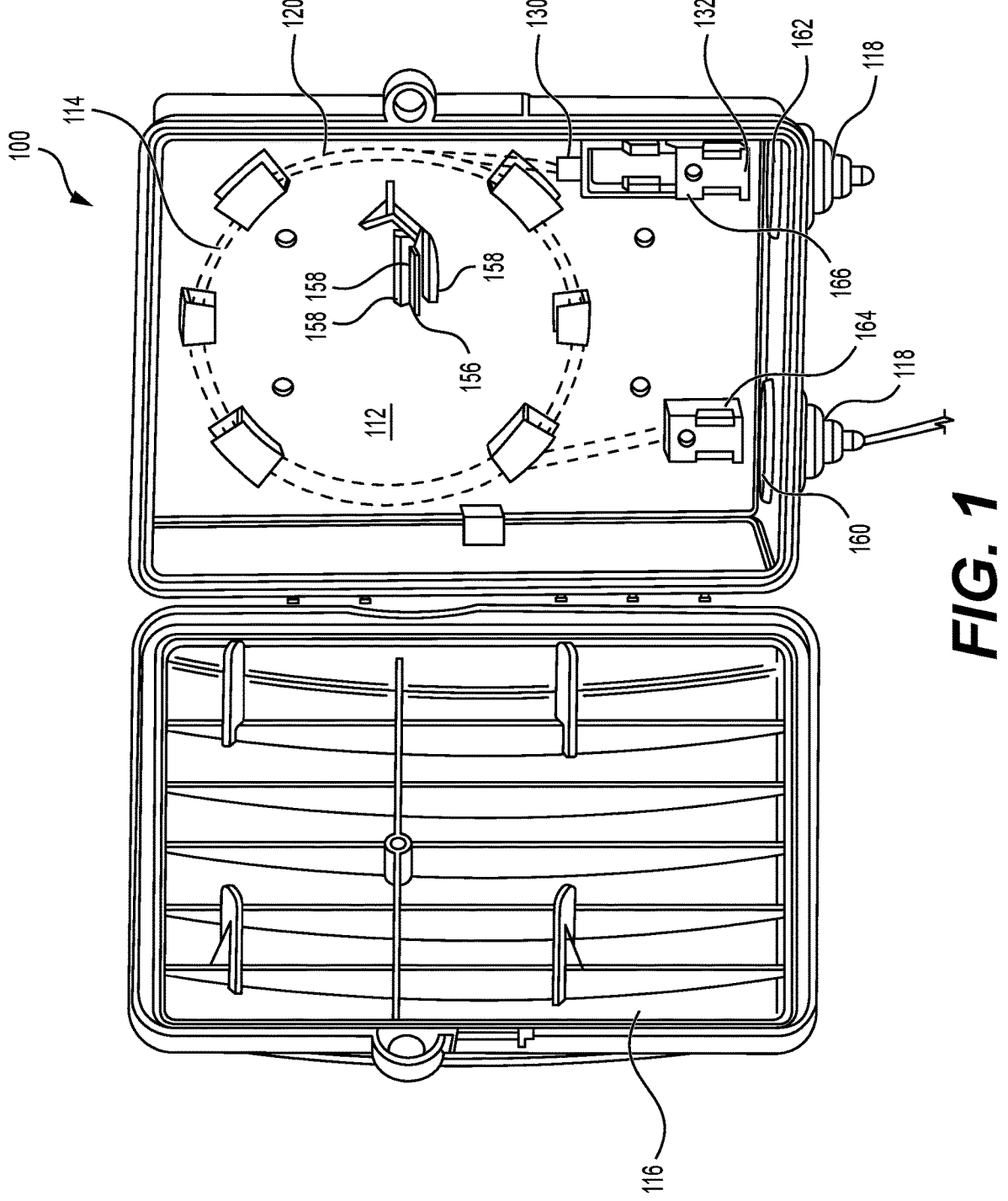
FIG. 1 is a front view of a cable enclosure.

FIG. 1 illustrates a fiber optic enclosure 100 which includes a spool 114 of fiber optic cable (slack cable) 120 provided on back panel 112 of the enclosure. The enclosure 100 has a cover 116. As shown, the spool 114 may be recessed within the interior of an enclosure 100. The enclosure 100 includes a splice sleeve 156 and an input cable and/or an adapter 166 disposed within the enclosure 100. The splice sleeve 156 may be configured to receive and couple two optical fibers (not shown). Ribs 158 may cooperate with the splice sleeve 156 to secure the splice sleeve 156 within the enclosure 100.

In the enclosure of FIG. 1, the back panel 112 includes a first support member 164 substantially aligned with a grommeted opening 160, and an adapter 166 substantially aligned with a grommeted opening 162. The first support member 164 may be configured to receive and/or securely hold, for example, a cable received through the grommeted opening 160 from outside the enclosure 100. Similarly, the adapter 166 may be configured to receive and/or securely hold, for example, connectors 130, 132 received proximate to the grommeted opening 162. The adapter 166 may be configured to receive two optical fiber connectors. In some cases, the connectors 130, 132 may be SC connectors, and the adapter 166 may be an SC coupler. Therefore, this cable enclosure is configured to only receive grommets at each opening 160, 162 from outside the enclosure 100, and the adapter 166 must be mounted on the backwall of the enclosure 100.

Figures 2, 3:
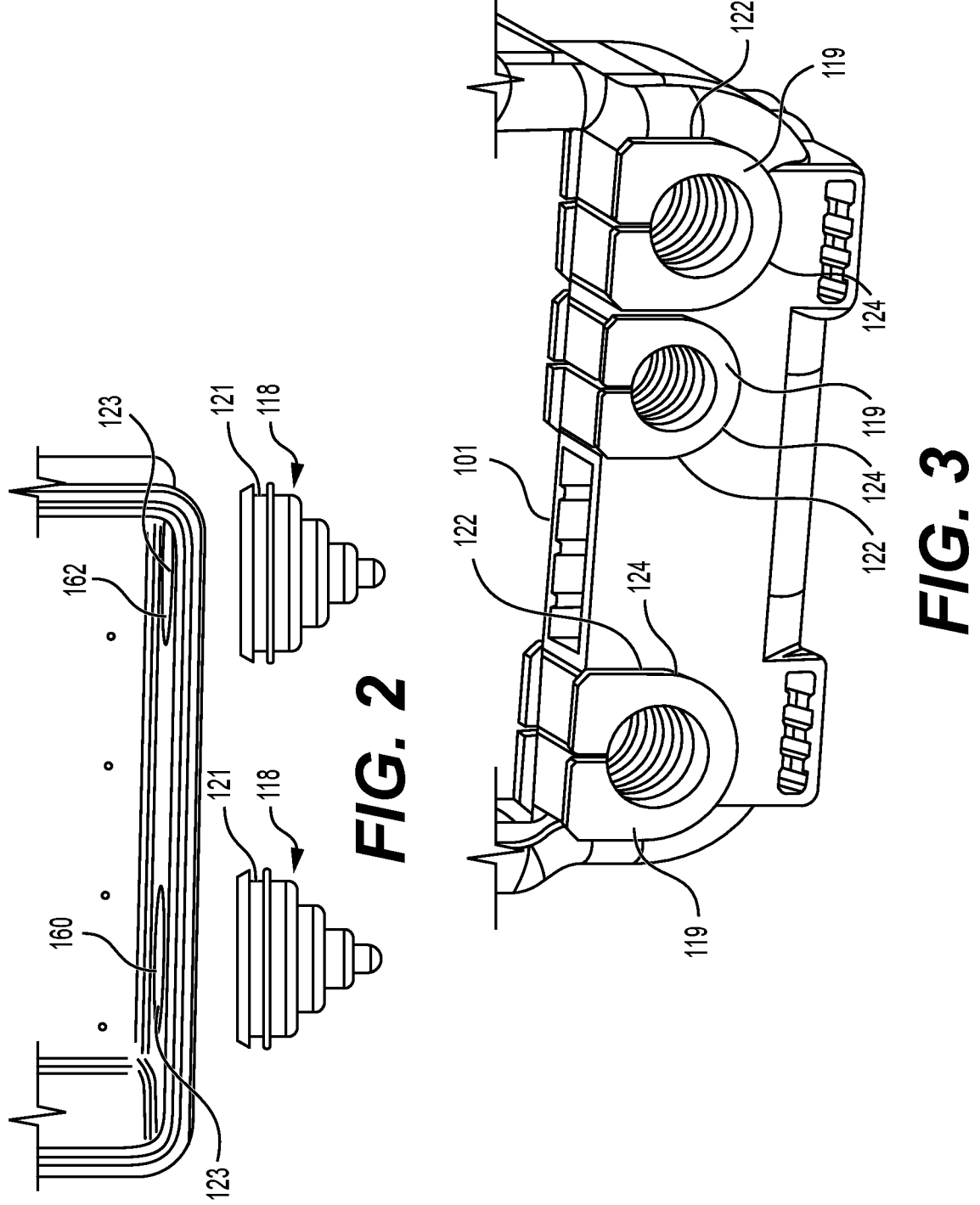
FIG. 2 is a front view of grommets used in the enclosure of FIG. 1.
FIG. 3 is perspective view of grommets used in a cable enclosure.

In the enclosure 100 of FIG. 1, two grommets 118 having curved edges may only be used at the openings 160, 162. The openings 160, 162 are not configured to receive any other type of component. FIG. 2 shows the grommets 118 before being inserted in to the openings 160, 162. FIG. 3 shows a different configuration having three grommets 119 in an enclosure 101. The grommets 118, 119 shown in FIGS. 2 and 3 each include at least one curved surface/edge 121, 122 that mates with curved openings 123, 124 defined in a panel of the enclosure 100, 101. Therefore, the curved openings 123, 124 of the enclosures 100, 101 are dedicated to only accommodating the grommets 118, 119. However, enclosure 100, which may include the use of the adapter 166 requires that the adapter 166 take up space within the enclosure 100, thereby potentially interfering with a user's access to the slack cable 120. Therefore, it is desirable to provide a cable enclosure assembly which can easily accommodate either an adapter or a grommet at each port of the enclosure.

Figure 5:
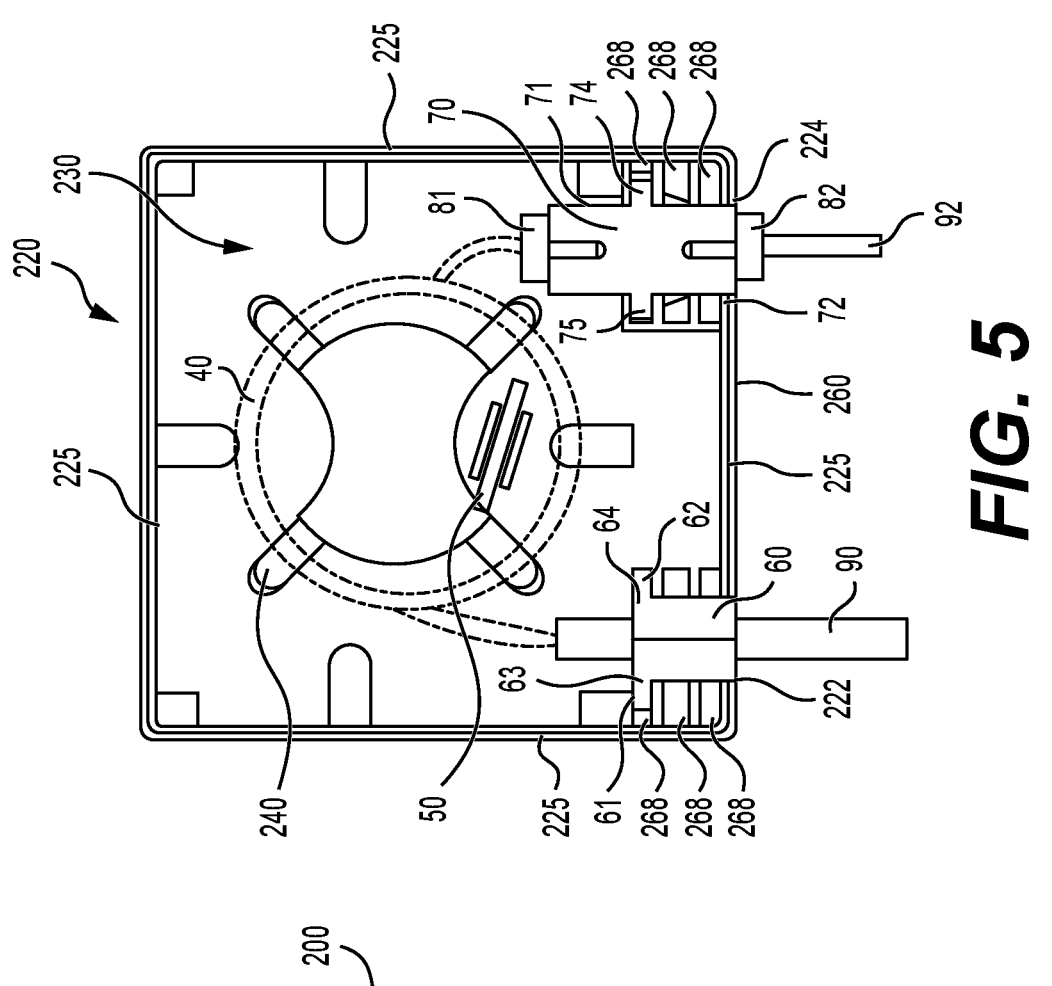
FIG. 5 is a front view of the enclosure of FIG. 4.
Figure 4:
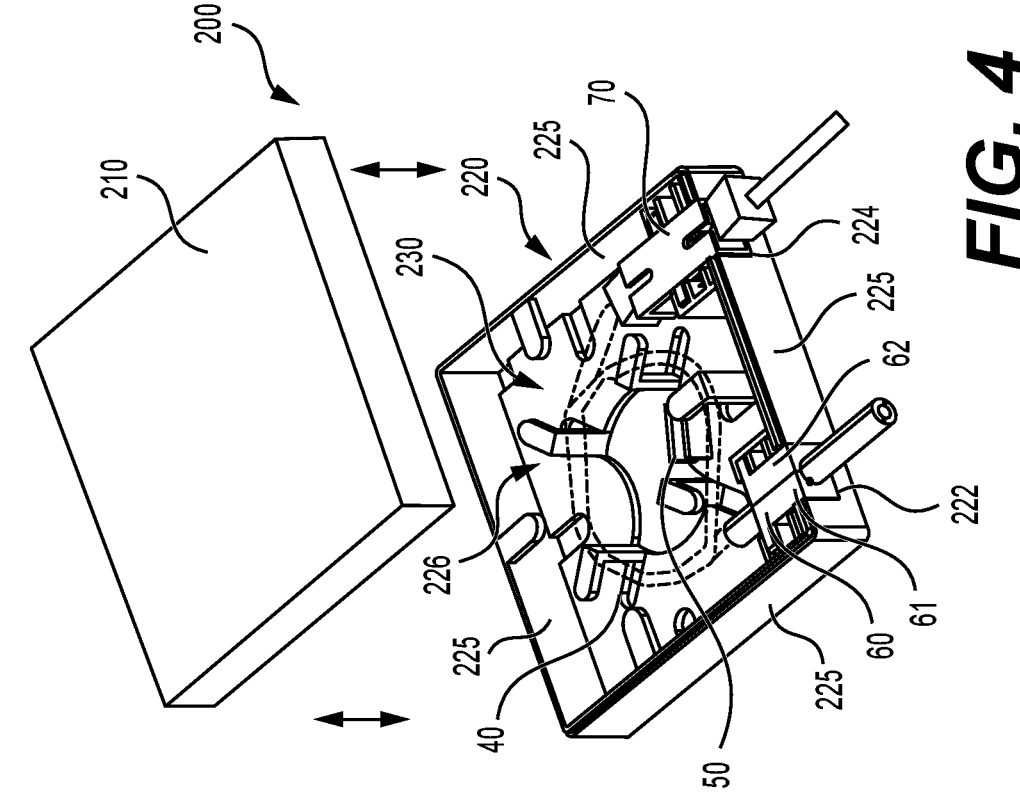
FIG. 4 is a perspective view of an exemplary cable enclosure in accordance with embodiments of the disclosure.

FIGS. 4 and 5 show an example of an enclosure 200 in accordance with embodiments of the disclosure. In this example, enclosure 200 has a base 220 and a cover 210. Enclosure 200 is configured to optionally store a spool of fiber optic cable (slack cable) 40 and/or a splice sleeve 50. Enclosure 200 is configured to accommodate either a cable retainer (grommet) 60 or an adapter 70 at either of a first opening 222 or a second opening 224 of the base 220. In this example, the base 220 has a backwall 226 and four side walls 225. The backwall 226 and the four side walls 225 define an interior 230, which can be closed by the cover 210.

Figures 6, 7, 8:
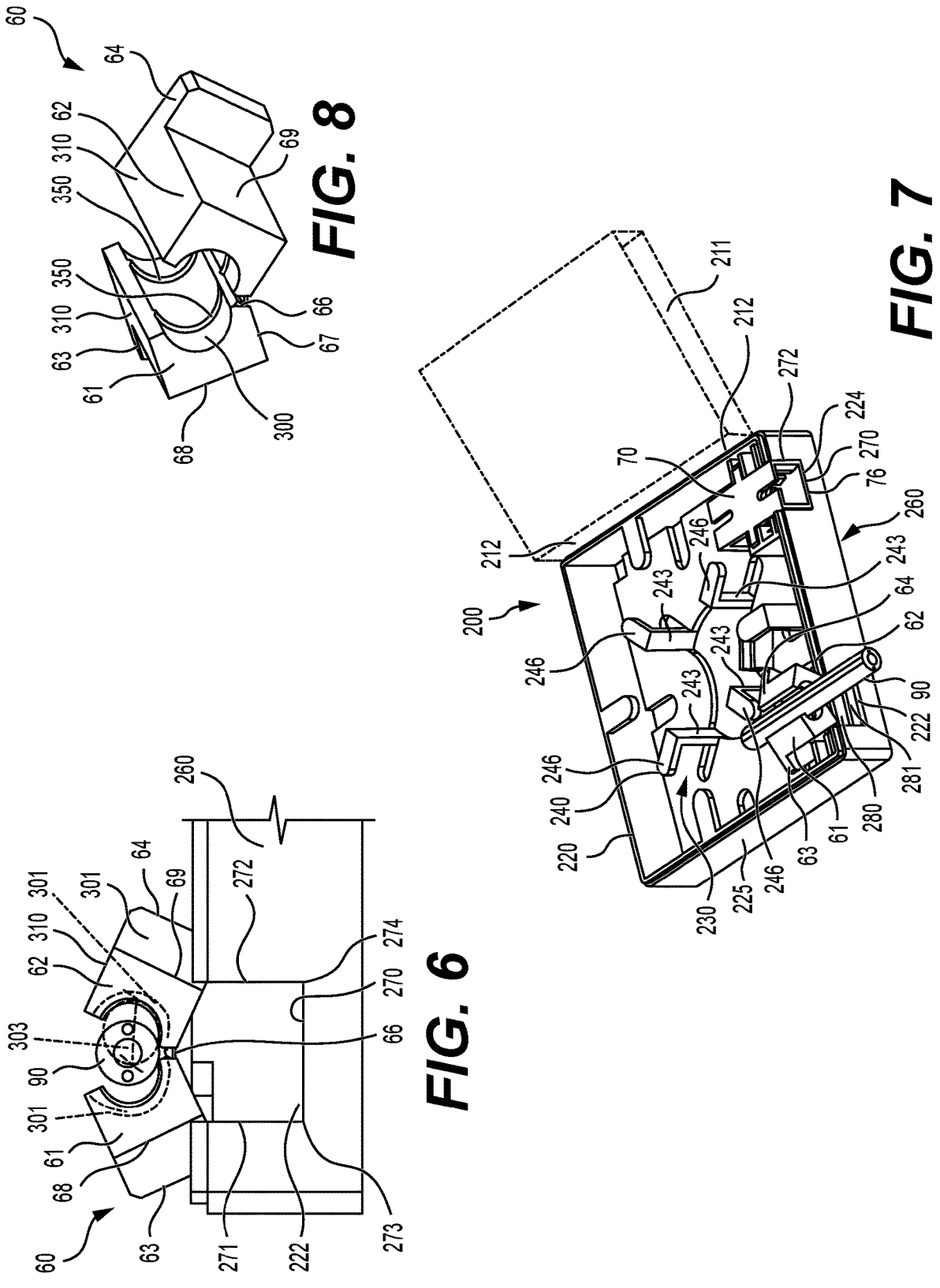
FIG. 6 is a partial bottom view of enclosure of FIG. 4 with an exemplary grommet partially installed in the enclosure.
FIG. 7 is a perspective view of the condition shown in FIG. 6.
FIG. 8 is a perspective view of the grommet of FIG. 6 without a cable.

In embodiments, the cover 210 is configured to be snap fitted onto the base 220. In other embodiments, a hinged cover 211 is configured to pivot between an open position, as shown in FIG. 7, and a closed position. In this example, the cover 211 is pivotably coupled to the base 220 by at least one hinge 212. Other types of couplings can be used to couple the cover 210, 211 to the base 220 such that the cover 210, 211 is movable between closed and open positions. In the closed position, the cover 210, 211 blocks access to the interior 230 of the enclosure 200. In the open position, the cover 210, 211 is configured to allow access to the interior 230 of the enclosure 200.

For example, in order to facilitate access to the cable 40 which is wound about a spool 240 and/or to access the adapter 70, the cover 211 may form an angle of between 90° and 160° relative to the base 220 in the open position. In some embodiments, the cover 211 may form an angle of 120° relative to the base 220 in the open position. In embodiments, the cover 211 can be disposed at any desired angle relative to the base 220 in the open position.

Figure 9:
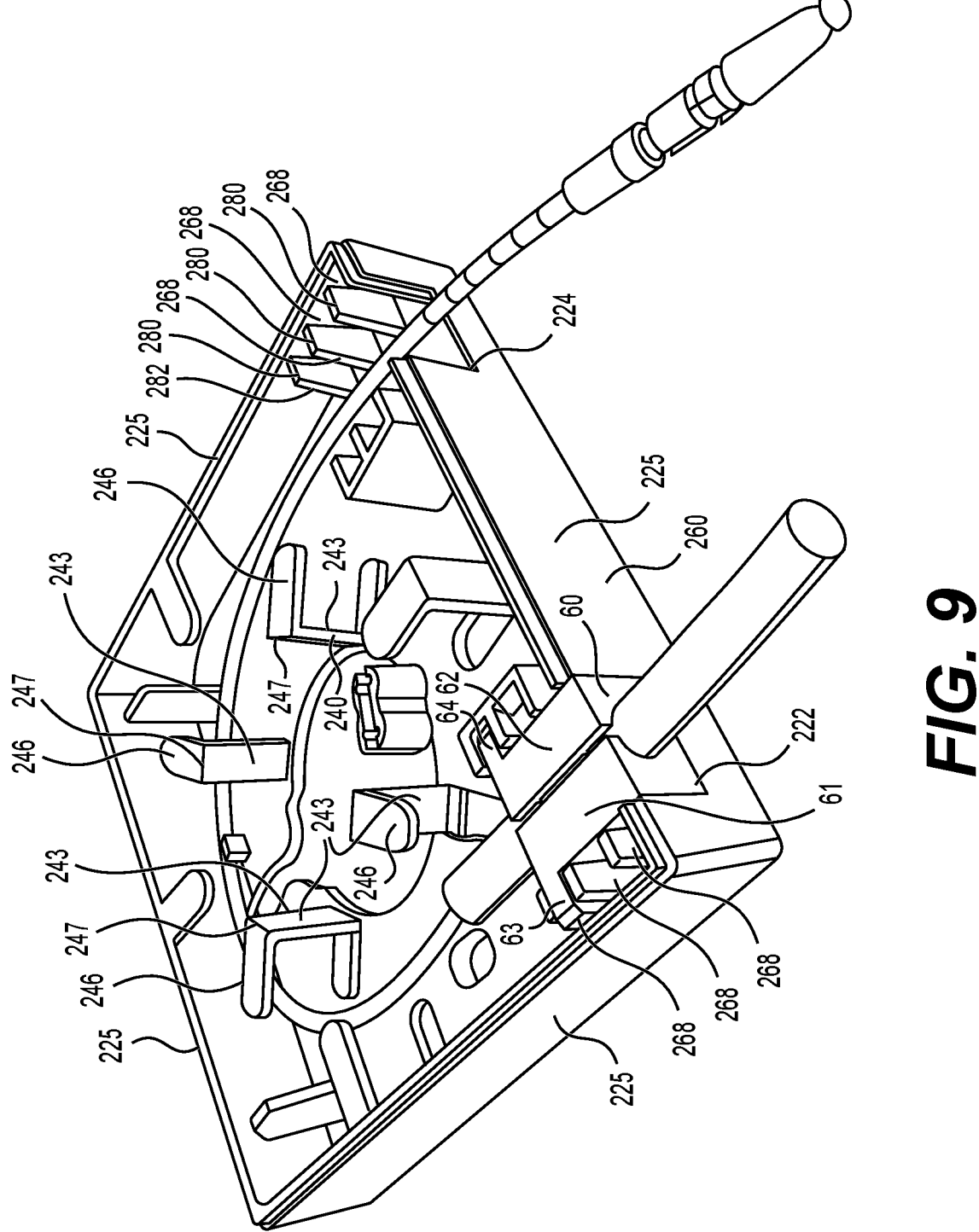
FIG. 9 is a perspective view of the enclosure of FIG. 4 with only one grommet installed.

As shown in FIGS. 7 and 9, in embodiments, the spool 240 includes a hub that includes a plurality of (in this example, four) hub projections 243 and a flange extension 246 disposed at a distal end 247 of one or more of the hub projections 243. In the example shown, each flange extension 246 is integral to each hub projection 243. Moreover, in this example, each hub projection 243 may, but not necessarily, be integral to the backwall 230 of the base 220. Thus, the spool 240 may be integral to the backwall 230 of the enclosure 200. Alternatively, the spool 240 may be mounted to a panel (not shown) which would then be attached to the backwall 230 of the base 220.

Referring to FIG. 5, the slack cable 40 can be wound about the hub portion 240. In embodiments, the hub projections 243 and the flange extensions 246 are a single flange (not shown) extending from a circular (or other shape) wall that corresponds to the hub projections 243. The flange extensions 238 (or single flange) prevent the cable 40 from sliding off the spool 240.

As best shown in FIG. 9, the first opening 222 and the second opening 224 are located in a bottom wall 260 of the side walls 225. In embodiments, one or more channels 268 are defined in the base 220 proximate to each of the openings 222, 224. As shown in FIG. 5, the channels 268 and the openings 222, 224 form a receiving area that is configured to accommodate the adapter 70 and the grommet 60. The adapter 70 may, but not necessarily, be an SC adapter as shown. The adapter 70 may be configured to couple SC connectors. In embodiments, the adapter 70 is configured to couple any fiber optic connector, including, but not limited to, ST, LC, MU, and MPO connectors. In embodiments, the first and second openings 222, 224 are configured to receive a cable 90 such as, for example, a multi-fiber cable (or duct) 90, wherein the cable 90 is supported within the opening 222, 224 using either the grommet 60 or the adapter 70.

In embodiments, the adapter 70 includes a first end 71 configured to receive a first connector 72 and a second end 81 configured to receive a second connector 82 of a drop cable 92 that runs from the enclosure 220 to an apartment or office of an end user. In this example, the adapter 70 has a first lateral extension 74 and a second lateral extension 75. In this example, the base 220 includes three channels 268. It is understood that any number of channels 268 can be used. As shown in FIG. 5, the channels 268 are configured to receive the first and second lateral extensions 74, 75 of the adapter 70. The plurality of channels 268 provides multiple locations for receiving, for example, lateral extensions 74, 75 (or other engagement features) of different size adapters.

In the example shown, the grommet 60 includes a first portion 61 and a second portion 62. In this example, the first portion 61 has a side extension 63 and the second portion 62 has a side extension 64. In this example, the first and second portions 61, 62 are joined together by a living hinge portion 66 as shown in FIGS. 6 and 8. A horizontal side 67 of the grommet 60 includes the first portion 61, the living hinge portion 66, and the second portion 62. As shown in FIG. 5, the side extensions 63, 64 of the grommet 60 are configured to fit in channels 268. In embodiments, the channels 268 are each configured to receive either the side extensions 63, 64 of the grommet 60 and the first and second lateral extensions 74, 75 of the adapter 70. Accordingly, the adapter 70 is secured within the base 220 due to the engagement between any of the channels 268 and the first and second lateral extensions 74, 75 of the adapter 70. Similarly, the grommet 60 is secured within the base 220 due to the engagement between any of the channels 268 and the side extensions 63, 64 of the grommet 60. In embodiments, the living hinge portion 66 biases the first portion 61 away from the second portion 62 such that the first portion 61 does not contact the second portion 62 in a rest position. In embodiments, in the rest position, portions of the first portion 61 that contact the second portion 62 in a fully installed position are oriented at an angle relative to the corresponding portions of the second portion 62. In embodiments, this angle is 180 degrees. In embodiments, this angle is 135 degrees. In embodiments, this angle is 90 degrees. In embodiments, this angle orients the first portion 61 and the second portion 62 such that lower corners of the grommet 60 fit into the upper edges of the receiving area before the cable 90 is inserted into the grommet 60.

In embodiments, each opening 222, 224 defines a lower horizontal edge/surface 270, a first vertical edge/surface 271, and a second vertical edge/surface 272. The first vertical edge/surface 271 is disposed at a first end 273 of the lower horizontal edge/surface 270 and the second vertical edge/surface 272 is disposed at a second end 274 of the lower horizontal edge/surface 270. In the non-limiting example of FIGS. 4-7, each channel 268 is defined by at least one channel wall 280. Each channel wall 280 defines a lower horizontal edge/surface 281 and at least one vertical edge edge/surface 282.

In embodiments, the grommet 60 includes a cable receiving passageway 300, the horizontal side 67, a left vertical side 68, upper side 310, and a right vertical side 69. The horizontal side 67 which is configured to abut the lower horizontal edge/surface 270 of the opening 222, 224 (and channel walls 280) when the grommet 30 is installed in one of the openings 222, 224 of the bottom wall 260 of the base 220. In embodiments, the cable receiving passageway 300 of the grommet 60 is configured to be compressed in a region 301 proximate to the cable 90 being held in the grommet 60 such that the cable 90 is held in position and cannot slide out of the grommet 60 and, thus, the base 220. In embodiments, the diameter 303 of the cable receiving passageway 300 may vary depending on the type of cable being retained in the grommet 30. The left vertical side 68 of the grommet 60 abuts the first vertical edge/surface 271 of the opening 222, 224 when the grommet 60 is installed in the opening 222, 224 of the bottom wall 260 of the base 220. The right vertical side 69 of the grommet 60 abuts the second vertical edge/surface 272 of the opening 222, 224 when the grommet 60 is installed in the opening 222, 224. In embodiments, the vertical edges of the channel walls 280 also abut the left vertical side 68 and the right vertical side 59 of the grommet 60 when the grommet 60 is installed in the opening 222, 224 of the base 220.

In embodiments, the grommet 60 is installed in the base 220 as follows. The cable 90 is placed into cable receiving passageway 300 as shown in FIG. 6 while the grommet 60 is in the position shown in FIG. 8. If the cable 90 has grooves in its outer surface, one or more of the grooves is aligned with one or more of the ribs 350 on the inner surface of the cable receiving passageway 300. The grommet 60 is then pressed into one of the openings 222, 224 with the vertical sides 68, 69 entering the opening 222, 224 as shown in FIGS. 6 and 7. As the grommet 60 is further pressed into the opening 222, 224, the vertical edges/surfaces 271, 272 contacting the vertical sides 68, 69 of the grommet 60 cause the first portion 61 and a second portion 62 of the grommet 60 to move toward each other and close the cable receiving passageway 300 around the cable 90. In embodiments, when the grommet is fully inserted into the opening 222, 224, upper sides 310 of the first and second portions 61, 62 of the grommet 60 are coplanar, or substantially coplanar (as shown in FIG. 9). The hinge 66 keeps the first and second portions 61, 62 of the grommet 60 in the proper orientation relative to each other while the grommet 60 is being installed.

Like the grommet 60, the adapter 70 has a horizontal side 76 which is configured to abut the lower horizontal edge/surface 270 of the opening 222, 224 (and the channel walls 280) when the adapter 70 is installed in the opening 222, 224 of the bottom wall 260 of the base 220. The vertical edges/surfaces 271 of the openings 222, 224 are configured to abut lateral sides of the adapter 70 when the adapter 70 is installed in the opening 222, 224. Similarly, the vertical edges/surfaces 282 of the channel walls 280 are configured to abut lateral sides of the adapter 70 when the adapter 70 is installed in the opening 222, 224.

In embodiments, the grommet 60 is made of a pliable material (such as, for example, a dielectric material) which allows the interior surface of the cable receiving passageway 300 to flex (and increase the opening of the passageway) depending on the size of the cable 90 received within the cable receiving passageway 300. The grommet 60 can be made from silicone rubber, polyurethane, or any other material that would provide the necessary pliability. In embodiments, the grommet 60 is configured with one or more ribs 350 located on the inner surface of the cable receiving passageway 300. In embodiments, each rib 350 is configured to engage with a circumferential groove in an outer surface of the cable 90. This engagement increases the resistance exerted on the cable 90 by the grommet 60 to oppose the cable 90 being pulled out of the grommet 60.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A device configured to provide enhanced installation of a cable at an optical fiber terminal comprising:

a cable enclosure mechanism comprising:

a base portion;

a cable retaining portion structured and arranged to receive an optical fiber cable;

a base portion structured and arranged to receive the cable retaining portion;

wherein the base portion includes a first receiving portion that is structured and arranged to receive a first fiber optic adapter and a second receiving portion that is structured and arranged to receive a second fiber optic adapter;

wherein the cable retaining portion comprises a first cable holding portion and a second cable holding portion connected by a pivot portion, and wherein the first cable holding portion includes a first exterior surface portion and the second cable holding portion includes a second exterior surface portion;

wherein the first receiving portion is configured to alternatively receive the cable retaining portion and a fiber optic adapter and the second receiving portion is configured to alternatively receive the cable retaining portion and a second fiber optic adapter so as to permit openings of the cable enclosure assembly to be alternatively configured as a cable pass through and an adapter port;

wherein the pivot portion is structured and adapted to bias the first cable holding portion away from the second cable holding portion in a rest position of the cable retaining portion such that the first exterior surface portion is arranged at an angle relative to the second exterior surface portion and the first cable holding portion does not contact the second cable holding portion in the rest position;

wherein the first receiving portion is structured and adapted to receive a portion of the first and second exterior portions of the cable retaining portion in the rest position;

wherein the second receiving portion is structured and adapted to receive a portion of the first and second exterior portions of the cable retaining portion in the rest position; and wherein the cable enclosure mechanism is structured and adapted to provide enhanced installation of a cable by permitting a cable to be placed between the first and second sealing portions of the cable retaining portion in the rest position and by structurally configuring the first receiving portion and the second receiving portion to compress the cable retaining portion on the cable when the cable retaining portion is inserted in the first receiving portion and the second receiving portion, respectively, so as to hold the cable.

2. The device of claim 1, wherein the first exterior surface portion is configured to be parallel to the second exterior surface portion when the cable retainer is in a fully installed position in the receiving portion.

3. The device of claim 1, wherein each of the first and second receiving portions includes a channel portion that is structured and arranged to receive a lateral extension of a fiber optic adapter.

4. The device of claim 3, wherein the cable retainer portion includes a side extension portion that extends from at least one of the first exterior surface portion, and the second exterior surface portion and is structured and arranged to be received in the respective channel portion.

5. The device of claim 1, wherein the pivot portion comprises a living hinge that is integrally formed with the first cable holding portion of the cable retaining portion and the second cable holding portion of the cable retaining portion.

6. The device of claim 1, wherein the cable retaining portion includes an internal rib portion structured and arranged to occupy a groove in the cable to restrain axial movement of the cable relative to the cable retaining portion and the base portion.

7. A device configured to provide enhanced installation of a cable at an optical fiber terminal comprising:

a cable enclosure mechanism comprising:

a base portion;

a cable retaining portion structured and arranged to receive an optical fiber cable;

a base portion structured and arranged to receive the cable retaining portion;

wherein the base portion includes a receiving portion structured and arranged to receive a fiber optic adapter;

wherein the cable retaining portion comprises a first cable holding portion and a second cable holding portion connected by a pivot portion, and wherein the first cable holding portion includes a first exterior surface portion and the second cable holding portion includes a second exterior surface portion;

wherein the receiving portion is configured to alternatively receive the cable retaining portion and a fiber optic adapter so as to permit an opening of the cable enclosure assembly to be alternatively configured as a cable pass through and an adapter port;

wherein the pivot portion is structured and adapted to bias the first cable holding portion away from the second cable holding portion in a rest position of the cable retaining portion such that the first exterior surface portion is arranged at an angle relative to the second exterior surface portion and the first cable holding portion does not contact the second cable holding portion in the rest position;

wherein the receiving portion is structured and adapted to receive a portion of the first and second exterior portions of the cable retaining portion in the rest position; and wherein the cable enclosure mechanism is structured and adapted to provide enhanced installation of a cable by permitting a cable to be placed between the first and second sealing portions of the cable retaining portion in the rest position and by structurally configuring the receiving portion to compress the cable retaining portion on the cable when the cable retaining portion is inserted in the receiving portion so as to hold the cable.

8. The device of claim 7, wherein the first exterior surface portion is configured to be parallel to the second exterior surface portion when the cable retainer is in a fully installed position in the receiving portion.

9. The device of claim 7, wherein the receiving portion includes a channel portion that is structured and arranged to receive a lateral extension of a fiber optic adapter.

10. The device of claim 9, wherein the cable retainer portion includes a side extension portion that extends from at least one of the first exterior surface portion and the second exterior surface portion, and is structured and arranged to be received in the channel portion.

11. The device of claim 7, wherein the pivot portion comprises a living hinge that is integrally formed with the first cable holding portion of the cable retaining portion and the second cable holding portion of the cable retaining portion.

12. The device of claim 7, wherein the cable retaining portion includes an internal rib portion structured and arranged to occupy a groove in the cable to restrain axial movement of the cable relative to the cable retaining portion and the base portion.

13. A device configured to provide enhanced installation of a cable at an optical fiber terminal comprising:

a cable enclosure mechanism comprising:

a base portion;

a cable retaining portion structured and arranged to receive an optical fiber cable;

a base portion structured and arranged to receive the cable retaining portion;

wherein the base portion includes a receiving portion structured and arranged to receive a fiber optic adapter;

wherein the cable retaining portion comprises a first cable holding portion and a second cable holding portion connected by a pivot portion;

wherein the receiving portion is configured to alternatively receive the cable retaining portion and a fiber optic adapter so as to permit an opening of the cable enclosure assembly to be alternatively configured as a cable pass through and an adapter port;

wherein the pivot portion is structured and adapted to bias the first cable holding portion away from the second cable holding portion in a rest position of the cable retaining portion such that the first cable holding portion does not contact the second cable holding portion in the rest position;

wherein the receiving portion is structured and adapted to receive a portion of the cable retaining portion in the rest position; and wherein the cable enclosure mechanism is structured and adapted to provide enhanced installation of a cable by permitting a cable to be placed between the first and second sealing portions of the cable retaining portion in the rest position and by structurally configuring the receiving portion to compress the cable retaining portion on the cable when the cable retaining portion is inserted in the receiving portion so as to hold the cable.

14. The device of claim 13, wherein the first cable holding portion includes a first exterior surface portion and the second cable holding portion includes a second exterior surface portion.

15. The device of claim 14, wherein the first exterior surface portion is configured to be parallel to the second exterior surface portion when the cable retainer is in a fully installed position in the receiving portion.

16. The device of claim 13, wherein the receiving portion includes a channel portion that is structured and arranged to receive a lateral extension of a fiber optic adapter.

17. The device of claim 16, wherein the cable retainer portion includes a side extension portion that extends from at least one of the first exterior surface portion and the second exterior surface portion, and is structured and arranged to be received in the channel portion.

18. The device of claim 13, wherein the pivot portion comprises a living hinge that is integrally formed with the first cable holding portion of the cable retaining portion and the second cable holding portion of the cable retaining portion.

19. The device of claim 13, wherein the cable retaining portion includes an internal rib portion structured and arranged to occupy a groove in the cable to restrain axial movement of the cable relative to the cable retaining portion and the base portion.

\* \* \* \* \*